United States Patent
Yamada et al.

(10) Patent No.: US 8,139,322 B2
(45) Date of Patent: Mar. 20, 2012

(54) MAGNETIC RECORDING HEAD WITH PROTRUDING SPIN TORQUE OSCILLATOR

(75) Inventors: Kenichiro Yamada, Tokyo (JP); Hitoshi Iwasaki, Kanagawa-ken (JP); Junichi Akiyama, Kanagawa-ken (JP); Masayuki Takagishi, Tokyo (JP); Tomomi Funayama, Saitama-ken (JP); Masahiro Takashita, Kanagawa-ken (JP); Mariko Shimizu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 808 days.

(21) Appl. No.: 12/153,490

(22) Filed: May 20, 2008

(65) Prior Publication Data

US 2009/0059423 A1 Mar. 5, 2009

(30) Foreign Application Priority Data

Sep. 4, 2007 (JP) ................. 2007-229121

(51) Int. Cl.
*G11B 5/31* (2006.01)
*G11B 5/235* (2006.01)
*G11B 5/39* (2006.01)

(52) U.S. Cl. ................. 360/125.3; 360/119.03; 360/317

(58) Field of Classification Search .......... 360/313–328, 360/125.3, 125.71, 128
See application file for complete search history.

(56) References Cited

U.S. PATENT DOCUMENTS

| | | |
|---|---|---|
| 4,103,315 A | 7/1978 | Hempstead et al. |
| 4,945,528 A | 7/1990 | Crasemann |
| 5,695,864 A | 12/1997 | Slonczewski |
| 5,748,399 A | 5/1998 | Gill |
| 5,768,066 A | 6/1998 | Akiyama et al. |
| 5,898,546 A | 4/1999 | Kanai et al. |
| 6,011,664 A | 1/2000 | Kryder et al. |
| 6,153,062 A | 11/2000 | Saito et al. |
| 6,580,589 B1 | 6/2003 | Gill |
| 6,583,969 B1 | 6/2003 | Pinarbasi |
| 6,621,664 B1 * | 9/2003 | Trindade et al. ............. 360/318 |
| 6,785,092 B2 | 8/2004 | Covington et al. |
| 6,927,952 B2 | 8/2005 | Shimizu et al. |
| 6,977,108 B2 | 12/2005 | Hieda et al. |
| 6,982,845 B2 | 1/2006 | Kai et al. |

(Continued)

FOREIGN PATENT DOCUMENTS

JP 64-070947 3/1989

(Continued)

OTHER PUBLICATIONS

Jian-Gang Zhu et al., "Micromagnetic Assisted Magnetic Recording (MAMR)", *The Magnetic Recording Conference (TMRC2007)*, May 2007, pp. 34-35.

(Continued)

*Primary Examiner* — Craig A. Renner
*Assistant Examiner* — Gustavo Polo
(74) *Attorney, Agent, or Firm* — Nixon & Vanderhye, P.C.

(57) ABSTRACT

A magnetic recording head includes: a main magnetic pole; a laminated body; and a pair of electrodes operable to pass a current through the laminated body. The laminated body includes a first magnetic layer, a second magnetic layer, and an intermediate layer provided between the first magnetic layer and the second magnetic layer. A lamination direction of the laminated body is substantially parallel to a medium moving direction. In a first direction parallel to an air bearing surface and perpendicular to the lamination direction, the laminated body has a protruding portion that protrudes beyond an end of a surface of the main magnetic pole facing the laminated body.

20 Claims, 15 Drawing Sheets

U.S. PATENT DOCUMENTS

| | | | |
|---|---|---|---|
| 7,119,990 B2 | 10/2006 | Bajorek et al. |
| 7,154,707 B2 | 12/2006 | Watabe et al. |
| 7,256,955 B2 | 8/2007 | Pokhil et al. |
| 7,397,633 B2 | 7/2008 | Xue et al. |
| 7,466,525 B2 | 12/2008 | Hasegawa et al. |
| 7,471,491 B2 | 12/2008 | Sato et al. |
| 7,473,478 B2 | 1/2009 | Sbiaa et al. |
| 7,504,898 B2 | 3/2009 | Fukuzawa et al. |
| 7,532,433 B2 | 5/2009 | Kawato et al. |
| 7,593,185 B2 | 9/2009 | Yazawa |
| 7,616,412 B2 | 11/2009 | Zhu et al. |
| 7,724,469 B2 | 5/2010 | Gao et al. |
| 7,764,136 B2 | 7/2010 | Suzuki |
| 7,791,829 B2 | 9/2010 | Takeo et al. |
| 7,808,330 B2 | 10/2010 | Fukuzawa et al. |
| 7,911,882 B2 | 3/2011 | Shimazawa et al. |
| 7,957,098 B2 | 6/2011 | Yamada et al. |
| 2002/0006013 A1 | 1/2002 | Sato et al. |
| 2002/0075595 A1 | 6/2002 | Sato et al. |
| 2002/0136927 A1 | 9/2002 | Hieda et al. |
| 2003/0026040 A1 | 2/2003 | Covington et al. |
| 2003/0090844 A1 | 5/2003 | Shimizu et al. |
| 2004/0150912 A1 | 8/2004 | Kawato et al. |
| 2004/0190197 A1 | 9/2004 | Watabe et al. |
| 2004/0228045 A1 | 11/2004 | Hasegawa et al. |
| 2005/0023938 A1 | 2/2005 | Sato et al. |
| 2005/0105213 A1 | 5/2005 | Takeo et al. |
| 2005/0207050 A1 | 9/2005 | Pokhil |
| 2005/0219771 A1 | 10/2005 | Sato et al. |
| 2007/0109147 A1 | 5/2007 | Fukuzawa et al. |
| 2008/0019040 A1 | 1/2008 | Zhu et al. |
| 2008/0112087 A1 | 5/2008 | Clinton et al. |
| 2008/0117545 A1 | 5/2008 | Batra et al. |
| 2008/0129401 A1 | 6/2008 | Fukuzawa et al. |
| 2008/0137224 A1 | 6/2008 | Gao et al. |
| 2008/0150643 A1 | 6/2008 | Suzuki et al. |
| 2008/0218891 A1 | 9/2008 | Gubbins et al. |
| 2008/0268291 A1 | 10/2008 | Akiyama et al. |
| 2008/0304176 A1 | 12/2008 | Takagishi et al. |
| 2009/0052095 A1 | 2/2009 | Yamada et al. |
| 2009/0059417 A1 | 3/2009 | Takeo et al. |
| 2009/0059418 A1 | 3/2009 | Takeo et al. |
| 2009/0059423 A1 | 3/2009 | Yamada et al. |
| 2009/0080105 A1 | 3/2009 | Takashita et al. |
| 2009/0080106 A1 | 3/2009 | Shimizu et al. |
| 2009/0080120 A1 | 3/2009 | Funayama et al. |
| 2009/0088095 A1 | 4/2009 | Kayano et al. |
| 2009/0097167 A1 | 4/2009 | Sato et al. |
| 2009/0097169 A1 | 4/2009 | Sato et al. |
| 2009/0225465 A1 | 9/2009 | Iwasaki et al. |
| 2009/0257151 A1 | 10/2009 | Zhang et al. |
| 2009/0262457 A1 | 10/2009 | Rivkin et al. |
| 2010/0007992 A1 | 1/2010 | Yamada et al. |
| 2010/0134922 A1 | 6/2010 | Yamada et al. |

FOREIGN PATENT DOCUMENTS

| | | |
|---|---|---|
| JP | 05-20635 | 1/1993 |
| JP | 07-244801 | 9/1995 |
| JP | 2002-100005 | 4/2002 |
| JP | 2002-279616 | 9/2002 |
| JP | 2004-295987 | 10/2004 |
| JP | 2005-108315 | 4/2005 |
| JP | 2005-525663 | 8/2005 |
| JP | 2005-285242 | 10/2005 |
| JP | 2006-209960 | 8/2006 |
| JP | 2006-209964 | 8/2006 |
| JP | 2007-012264 | 1/2007 |
| JP | 2007-124340 | 5/2007 |
| JP | 2007-184923 | 7/2007 |
| JP | 2007-193906 | 8/2007 |
| JP | 2008-123669 | 5/2008 |
| KR | 1020030039289 | 5/2003 |
| WO | 2006/101040 A1 | 9/2006 |

OTHER PUBLICATIONS

X. Zhu and J.-G. Zhu, "Bias-Field-Free Microwave Oscillator Driven by Perpendicularly Polarized Spin Current," IEEE Trans. Magn. vol. 42, p. 2670 (2006).
Zhu et al., "Microwave Assisted Magnetic Recording (MAMR)", Digest of the 18$^{th}$ Magnetic Recording Conference, pp. 34-35, 2007.
Yamada et al., U.S. Appl. No. 12/155,329, filed Jun. 2, 2008.
Takagishi et al., U.S. Appl. No. 12/155,473, filed Jun. 4, 2008.
Takeo et al., U.S. Appl. No. 12/196,628, filed Aug. 22, 2008.
Iwasaki et al., U.S. Appl. No. 12/232,014, filed Sep. 9, 2008.
Takashita et al., U.S. Appl. No. 12/232,391, filed Sep. 16, 2008.
Funayama et al., U.S. Appl. No. 12/232,392, filed Sep. 16, 2008.
Shimizu et al., U.S. Appl. No. 12/232,469, filed Sep. 17, 2008.
Yamada et al., U.S. Appl. No. 12/780,269, filed May 13, 2010.
Akiyama et al., U.S. Appl. No. 12/109,760, filed Apr. 25, 2008.
Takeo et al., U.S. Appl. No. 12/196,841, filed Aug. 22, 2008.
Office Action dated Oct. 12, 2011 in JP Application No. 2007-229121 and English-language translation thereof.

* cited by examiner

MAGNETIC RECORDING HEAD WITH PROTRUDING SPIN TORQUE OSCILLATOR

CROSS-REFERENCE TO RELATED APPLICATIONS

This application is based upon and claims the benefit of priority from the prior Japanese Patent Application No. 2007-229121, filed on Sep. 4, 2007; the entire contents of which are incorporated herein by reference.

BACKGROUND OF THE INVENTION

1. Field of the Invention

This invention relates to a magnetic recording head and a magnetic recording apparatus provided with a spin torque oscillator, suitable for realizing data storage with high recording density, high recording capacity, and high data transfer rate.

2. Background Art

In the 1990s, the practical application of MR (magnetoresistive effect) heads and GMR (giant magnetoresistive effect) heads triggered a dramatic increase in the recording density and recording capacity of HDD (hard disk drive). However, in the early 2000s, the problem of thermal fluctuations in magnetic recording media became manifest, and hence the increase of recording density temporarily slowed down. Nevertheless, perpendicular magnetic recording, which is in principle more advantageous to high-density recording than longitudinal magnetic recording, was put into practical use in 2005. It serves as an engine for the increase of HDD recording density, which exhibits an annual growth rate of approximately 40% these days.

Furthermore, the latest demonstration experiments have achieved a recording density exceeding 400 Gbits/inch$^2$. If the development continues steadily, the recording density is expected to achieve 1 Tbits/inch$^2$ around 2012. However, it is considered that such a high recording density is not easy to achieve even by using perpendicular magnetic recording because the problem of thermal fluctuations becomes manifest again.

As a recording scheme possibly solving the above problem, the "microwave assisted magnetic recording scheme" is proposed. In the microwave assisted magnetic recording scheme, a high-frequency magnetic field near the resonance frequency of the magnetic recording medium, which is sufficiently higher than the recording signal frequency, is locally applied. This produces resonance in the magnetic recording medium, which decreases the coercivity (Hc) of the magnetic recording medium subjected to the high-frequency magnetic field to less than half the original coercivity. Thus, superposition of a high-frequency magnetic field on the recording magnetic field enables magnetic recording on a magnetic recording medium having higher coercivity (Hc) and higher magnetic anisotropy energy (Ku) (e.g., U.S. Pat. No. 6,011,664, hereinafter referred to as Patent Document 1). However, the technique disclosed in Patent Document 1 uses a coil to generate a high-frequency magnetic field, and it is difficult to efficiently apply a high-frequency magnetic field during high-density recording.

Techniques based on a spin torque oscillator are also proposed as a means for generating a high-frequency magnetic field (e.g., US Patent Application Publication No. 2005/0023938, hereinafter referred to as Patent Document 2; US Patent Application Publication No. 2005/0219771, hereinafter referred to as Patent Document 3; and 3. Zhu et al., "Microwave Assisted Magnetic Recording (MAMR)", Digest of the 18th Magnetic Recording Conference (TMRC), B6, p. 34-35, 2007, hereinafter referred to as Non-Patent Document 1). In the techniques disclosed in Patent Documents 2 and 3 and Non-Patent Document 1, the spin torque oscillator comprises a spin injection layer, a nonmagnetic layer, a magnetic layer, and electrodes. When a DC current is passed through the spin torque oscillator via the electrode, the spin torque generated by the spin injection layer produces ferromagnetic resonance in the magnetization of the magnetic layer. Consequently, a high-frequency magnetic field is generated from the spin torque oscillator.

Because the spin torque oscillator has a size of approximately several ten nanometers, the generated high-frequency magnetic field is localized within approximately several ten nanometers around the spin torque oscillator. Furthermore, the perpendicularly magnetized magnetic recording medium can be efficiently resonated by the longitudinal component of the high-frequency magnetic field, allowing a significant decrease in the coercivity of the magnetic recording medium. Consequently, high-density magnetic recording is performed only in a portion where the recording magnetic field of the main magnetic pole is superposed on the high-frequency magnetic field of the spin torque oscillator, allowing utilization of magnetic recording media having high coercivity (Hc) and high magnetic anisotropy energy (Ku), as proposed in, e.g., Non-Patent Document 1. Thus the problem of thermal fluctuations during high-density recording can be avoided.

SUMMARY OF THE INVENTION

According to an aspect of the invention, there is provided a magnetic recording head including: a main magnetic pole; a laminated body including a first magnetic layer, a second magnetic layer, and an intermediate layer provided between the first magnetic layer and the second magnetic layer; and a pair of electrodes operable to pass a current through the laminated body, a lamination direction of the laminated body being substantially parallel to a medium moving direction, and in a first direction parallel to an air bearing surface and perpendicular to the lamination direction, the laminated body having a protruding portion that protrudes beyond an end of a surface of the main magnetic pole facing the laminated body.

According to another aspect of the invention, there is provided a magnetic recording apparatus including: a magnetic recording medium; a magnetic recording head including: a main magnetic pole; a laminated body including a first magnetic layer, a second magnetic layer, and an intermediate layer provided between the first magnetic layer and the second magnetic layer; and a pair of electrodes operable to pass a current through the laminated body, a lamination direction of the laminated body being substantially parallel to a medium moving direction, and in a first direction parallel to an air bearing surface and perpendicular to the lamination direction, the laminated body having a protruding portion that protrudes beyond an end of a surface of the main magnetic pole facing the laminated body; moving mechanism configured to allow relative movement between the magnetic recording medium and the magnetic recording head which are opposed to each other with a spacing therebetween or in contact with each other; controller configured to position the magnetic recording head at a prescribed recording position of the magnetic recording medium; and signal processing unit configured to perform writing and reading of a signal on the magnetic recording medium by using the magnetic recording head.

DETAILED DESCRIPTION OF THE INVENTION

Embodiments of the invention will now be described with reference to the drawings.

A first embodiment of a microwave assisted magnetic recording head of the invention is described in the case of recording on a multiparticle medium for perpendicular magnetic recording.

Figure 1:
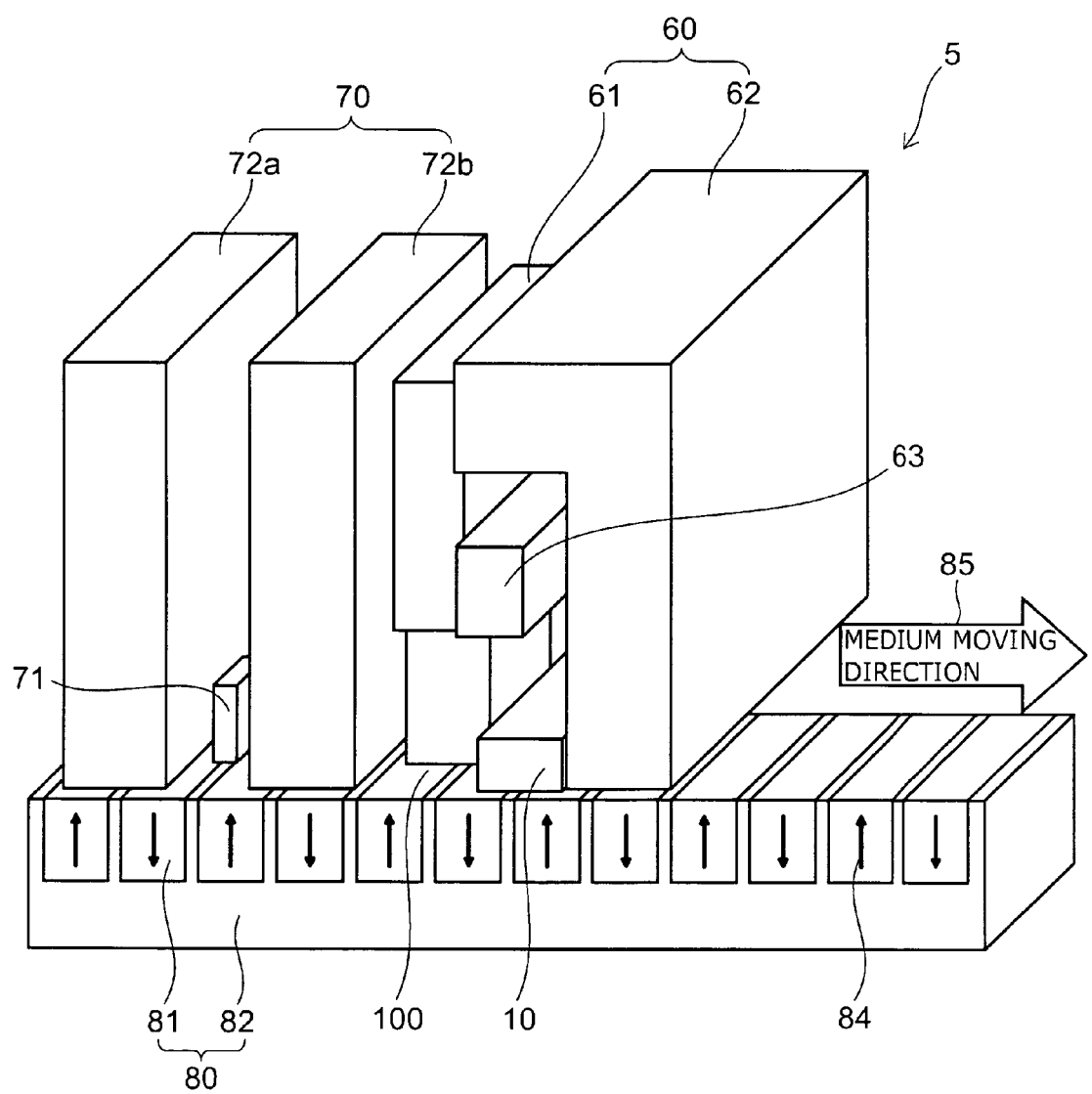
FIG. 1 is a perspective view showing the schematic configuration of a magnetic recording head.

FIG. 1 is a perspective view showing the schematic configuration of a magnetic recording head according to the embodiment of the invention.

Figure 2:
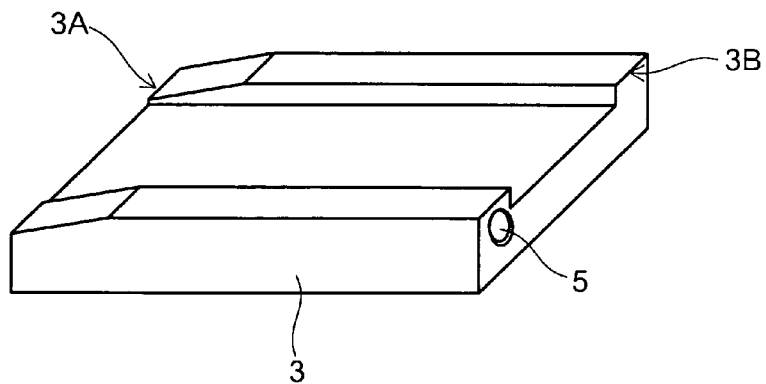
FIG. 2 is a perspective view showing a head slider on which the magnetic recording head is mounted.

FIG. 2 is a perspective view showing a head slider on which the magnetic recording head is mounted.

The magnetic recording head 5 of this embodiment comprises a reproducing head section 70 and a writing head section 60. The reproducing head section 70 comprises a magnetic shield layer 72a, a magnetic shield layer 72b, and a magnetic reproducing device 71 provided between the magnetic shield layer 72a and the magnetic shield layer 72b.

The writing head section 60 comprises a main magnetic pole 61, a return path (shield) 62, an excitation coil 63, and a spin torque oscillator 10. The components of the reproducing head section 70 and the components of the writing head section 60 are separated from each other by alumina or other insulators, not shown. The magnetic reproducing device 71 can be a GMR device or a TMR (tunnel magnetoresistive effect) device. In order to enhance reproducing resolution, the magnetic reproducing device 71 is placed between the two magnetic shield layers 72a and 72b.

The magnetic recording head 5 is mounted on a head slider 3 as shown in FIG. 2. The head slider 3, illustratively made of $Al_2O_3$/TiC, is designed and worked so that it can move relative to a magnetic recording medium 80 such as a magnetic disk while floating thereabove or being in contact therewith.

The head slider 3 has an air inflow side 3A and an air outflow side 3B, and the magnetic recording head 5 is disposed illustratively on the side surface of the air outflow side 3B.

The magnetic recording medium 80 has a medium substrate 82 and a magnetic recording layer 81 provided thereon. The magnetization of the magnetic recording layer 81 is controlled to a prescribed direction by the magnetic field applied from the writing head section 60, and thereby writing is performed. The reproducing head section 70 reads the direction of magnetization of the magnetic recording layer 81.

Figure 3:
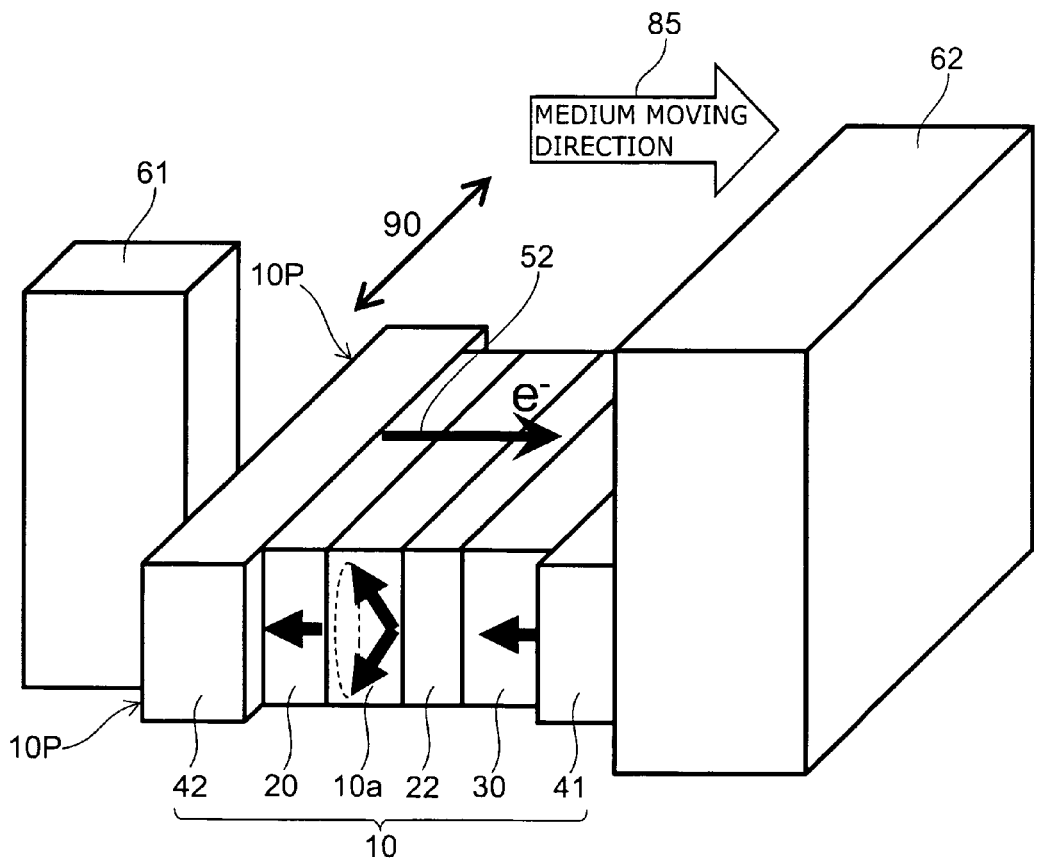
FIG. 3 is a schematic view illustrating the structure of a spin torque oscillator provided in the magnetic recording head.

FIG. 3 is a schematic view illustrating the structure of the spin torque oscillator 10 provided in this magnetic recording head 5.

The spin torque oscillator 10 has a structure in which a first electrode 41, a spin injection layer 30 (second magnetic layer), an intermediate layer 22 having high spin transmissivity, an oscillation layer 10a (first magnetic layer), a bias layer 20, and a second electrode 42 are laminated in this order in the direction from the shield 62 to the main magnetic pole 61. The lamination plane is generally perpendicular to the air bearing surface 100. The laminated body including the spin injection layer 30, the intermediate layer 22, and the oscillation layer 10a has a portion 10P protruding beyond the core width of the opposed main magnetic pole 61 in the direction 90 perpendicular to the medium moving direction 85 and parallel to the air bearing surface 100 (see FIG. 1). By passing a current through the spin torque oscillator 10 via the electrode 41 and the electrode 42, a high-frequency magnetic field can be generated. The driving current density is preferably from $5 \times 10^7$ A/cm$^2$ to $1 \times 10^9$ A/cm$^2$, and suitably adjusted so as to achieve a desired oscillation.

The electrode 41 and the electrode 42 can be made of a material having low electrical resistance and being resistant to oxidation such as Ti and Cu.

The intermediate layer 22 can be made of a material having high spin transmissivity such as Cu, Au, and Ag. The thickness of the intermediate layer 22 is preferably from one atomic layer to 3 nm. This can reduce exchange coupling between the oscillation layer 10a and the spin injection layer 30.

The oscillation layer 10a is made of a high-Bs soft magnetic material (FeCo/NiFe laminated film) generating a magnetic field during oscillation. The thickness of the oscillation layer 10a is preferably from 5 nm to 20 nm. The spin injection layer 30 is made of a CoPt alloy with its magnetization oriented perpendicular to the film plane. The thickness of the spin injection layer 30 is preferably from 2 nm to 60 nm.

The spin injection layer 30 and the oscillation layer 10a can be a soft magnetic layer of CoFe, CoNiFe, NiFe, CoZrNb, FeN, FeSi, or FeAlSi having a relatively high saturation magnetic flux density and having magnetic anisotropy in a direction longitudinal to the film plane, or a CoCr-based magnetic alloy film with its magnetization oriented in a direction longitudinal to the film plane. It is also possible to suitably use a material layer having good perpendicular orientation such as a CoCrPt, CoCrTa, CoCrTaPt, CoCrTaNb, or other CoCr-based magnetic layer, a TbFeCo or other RE-TM amorphous alloy magnetic layer, a Co/Pd, Co/Pt, CoCrTa/Pd, or other Co artificial lattice magnetic layer, a CoPt-based or FePt-based alloy magnetic layer, or a SmCo-based alloy magnetic layer, with the magnetization oriented perpendicular to the film plane. More than one of the above materials may be laminated. This is intended for adjusting the saturation magnetic flux density (Bs) and the anisotropy magnetic field (Hk) of the oscillation layer 10a and the spin injection layer 30.

The oscillation layer 10a is preferably made of a magnetic material which has a lower coercivity (Hc) and a higher saturation magnetic flux density (Bs) than that of the spin injection layer 30.

The oscillation layer 10a and the spin injection layer 30 made of the above materials may be laminated via the intermediate layer 22 into a laminated ferri structure in which the above materials may have antiparallel magnetizations, or the above materials have parallel magnetizations. This is intended for increasing the oscillation frequency of the spin oscillation layer 10a, and for efficiently magnetizing the spin injection layer 30. In this case, the intermediate layer 22 is preferably made of a nonmagnetic material. Specifically, the intermediate layer 22 is preferably made of a noble metal such as Cu, Pt, Au, Ag, Pd, or Ru, or can be made of a nonmagnetic transition metal such as Cr, Rh, Mo, or W.

As described later, to achieve stable oscillation driven by precession about the magnetization direction, the oscillation layer 10a preferably has equal dimensions in the direction toward the adjacent track and in the direction perpendicular to the air bearing surface (ABS) 100.

In FIG. 3, the lamination is made so that the oscillation layer 10a is adjacent to the main magnetic pole 61. Alternatively, in order to decrease the magnetic field from the main magnetic pole to the oscillation layer 10a, the lamination may be made so that the spin injection layer 30 is adjacent to the main magnetic pole 61.

In a writing head consisting only of the main magnetic pole 61, the magnetic field generated from the main magnetic pole 61 spreads radially from the main magnetic pole 61 and applied to a large portion of the spin torque oscillator 10. Hence it is preferable to provide a shield 62 for absorbing the magnetic field generated from the main magnetic pole 61. That is, the shield 62 is preferably placed so that the spin torque oscillator 10 is located between the main magnetic pole 61 and the shield 62. Consequently, the magnetic field from the main magnetic pole 61 is applied perpendicular to the side surface of the shield 62, and the magnetic field application portion of the spin torque oscillator 10 is restricted to a portion having the core width dimension of the main magnetic pole 61.

Next, the operation of the microwave assisted magnetic recording head according to the first embodiment of the invention is described.

Figure 4:
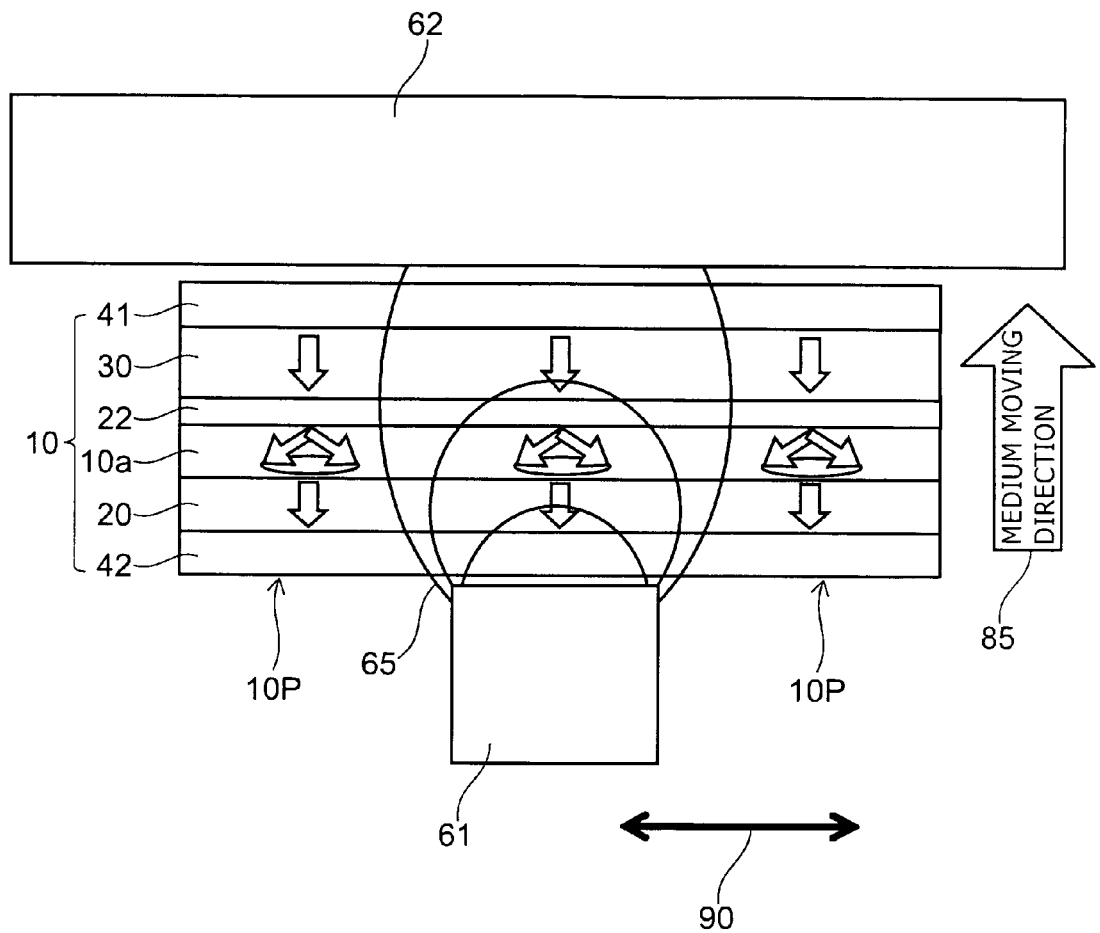
FIG. 4 is a schematic view showing the distribution of the magnetic field generated by the main magnetic pole.

FIG. 4 is a schematic view showing the distribution of the magnetic field generated by the main magnetic pole 61 as viewed from the floating surface during the write operation of the magnetic recording head 5 provided with the spin torque oscillator 10 shown in FIG. 3.

The magnetic field applied from the main magnetic pole 61 to the spin torque oscillator 10 is restricted to the main magnetic pole core width dimension as shown by isofield lines 65. Hence the portion of the spin torque oscillator 10 protruding beyond the main magnetic pole core width is not affected by the magnetic field from the main magnetic pole 61. The portion of the spin torque oscillator 10 having the main magnetic pole core width dimension has a strong magnetic coupling to the portion of the spin torque oscillator 10 protruding beyond the main magnetic pole core width by the exchange coupling in the film. Hence the protruding portion of the spin torque oscillator 10 serves as a magnetization pinning region to affect the portion of the spin torque oscillator 10 having the main magnetic pole core width dimension, enabling prevention of the effect of the magnetic field from the main magnetic pole 61. Consequently, even if the magnetic field applied from the main magnetic pole 61 to the spin torque oscillator 10 varies, that is, even if the write direction changes, the oscillation state of the spin torque oscillator 10 is prevented from varying. Furthermore, aging change in the magnetization direction of the spin injection layer 30 can be prevented.

FIG. 5 shows graphs illustrating the write operation of the magnetic recording head of this embodiment.

Figure 5A:
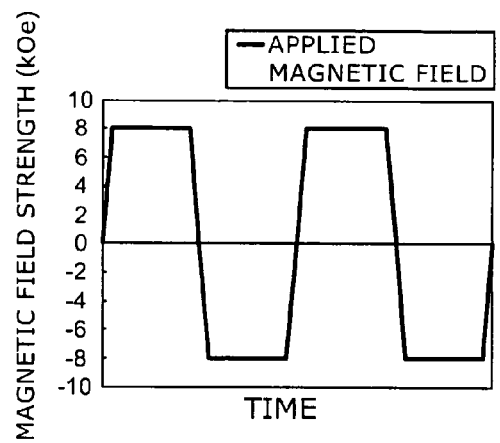
FIGS. 5A to 5D show graphs illustrating the write operation of the magnetic recording head shown in FIG. 3.
Figure 5C:
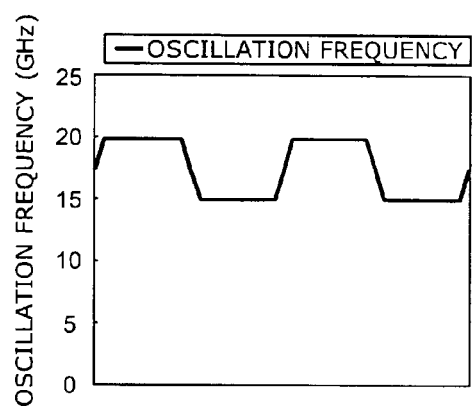
Figure 5B:
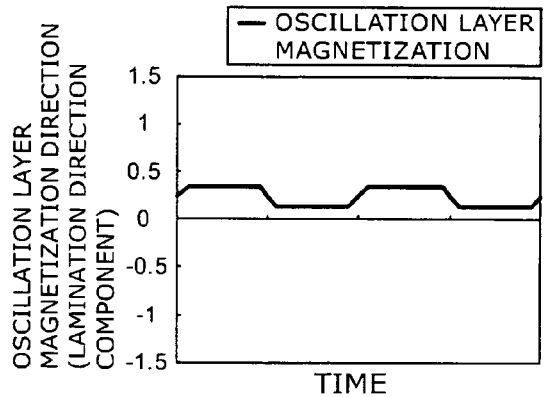
Figure 5D:
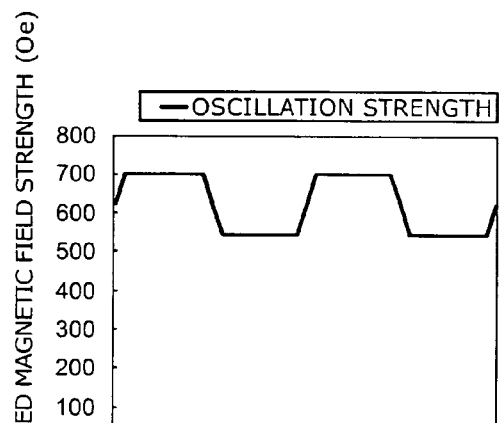

FIG. 5A shows the time dependence of the magnetic field applied by the main magnetic pole 61 to the spin torque oscillator 10, FIG. 5B shows the time dependence of the magnetization direction of the oscillation layer 10a, FIG. 5C shows the time dependence of the oscillation frequency of the spin torque oscillator 10, and FIG. 5D shows the time dependence of the generated magnetic field strength. The oscillation frequency is proportional to the strength of the static magnetic field applied to the oscillation layer 10a.

Even if the magnetic field applied from the main magnetic pole 61 to the spin torque oscillator 10 varies, the magnetic field is not applied to the portion of the spin torque oscillator 10 protruding beyond the main magnetic pole core width, and hence the magnetization of the protruding portion does not vary. For this reason, as shown in FIG. 5B, the magnetization direction of the oscillation layer 10a has little variation, and particularly, is free from reversal to the negative direction due to the exchange coupling effect from the bias layer 20. Accordingly, variation in the oscillation frequency and the generated magnetic field strength is also held down.

FIG. 6 shows graphs illustrating the write operation of a microwave assisted magnetic recording head according to a comparative example. More specifically, FIG. 6A shows the time dependence of the magnetic field applied by the main magnetic pole 61 to the spin torque oscillator 10, FIG. 6B shows the time dependence of the magnetization direction of the oscillation layer 10a, FIG. 6C shows the time dependence of the oscillation frequency of the spin torque oscillator 10, and FIG. 6D shows the time dependence of the generated magnetic field strength.

Figure 6A:
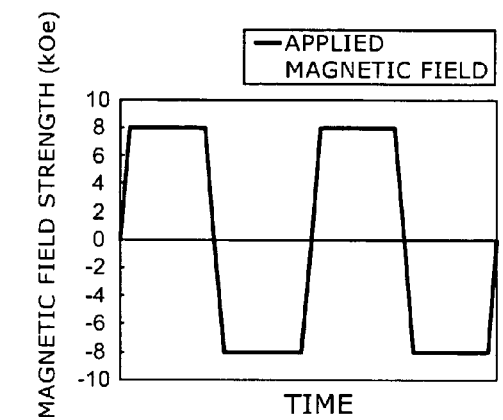
FIGS. 6A to 6D show graphs illustrating the write operation of a magnetic head according to a comparative example.
Figure 6B:
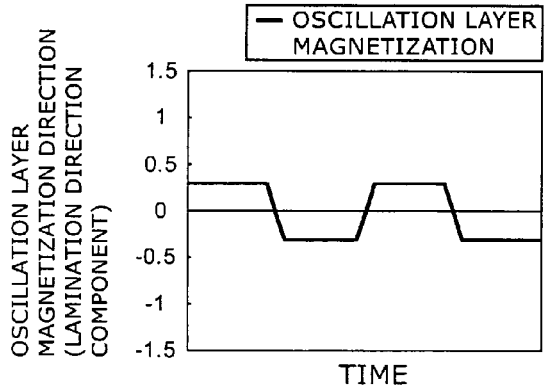
Figure 6C:
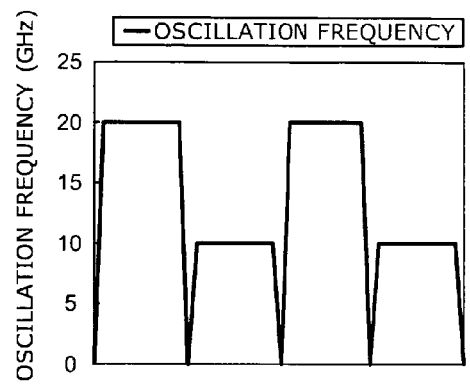
Figure 6D:
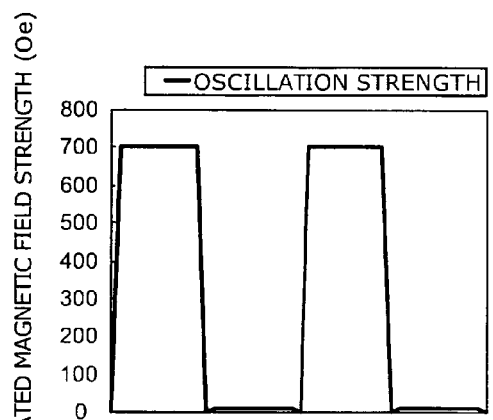

In this comparative example, as shown in FIG. 6B, the magnetization of the oscillation layer 10a changes in polarity depending on the writing direction. Hence, as shown in FIGS. 6C and 6D, the oscillation frequency and the generated magnetic field of the spin torque oscillator 10 unfortunately vary with the writing direction.

Next, a description is given of the dimensions of the protruding portion of the spin torque oscillator 10.

Preferably, the length of the protruding portion of the spin torque oscillator 10 in the direction of the main magnetic pole core width is at least not less than the domain wall width $(n \times (A \times Ku)^{1/2})$ of the oscillation layer 10a, where A is the exchange coupling constant, and Ku is the magnetic anisotropy energy. The domain wall width refers to the length required for the transition of the magnetization direction. The portion of the spin torque oscillator 10 protruding beyond the main magnetic pole core width by the domain wall width or more of the oscillation layer 10a is not affected by the magnetic field from the main magnetic pole 61, and is free from variation in magnetization. The exchange coupling force from this protruding portion prevents reversal of the magnetization in the portion of the spin torque oscillator 10 having the core width dimension subjected to the magnetic field, allowing pinning of the magnetization of the portion of the spin torque oscillator 10 having the core width dimension. Furthermore, after the magnetic field from the main magnetic pole 61 vanishes, the magnetization direction of the spin torque oscillator 10 can be fixed to enhance resistance to aging change.

The length of the portion of the spin torque oscillator 10 protruding in the direction of the main magnetic pole core width may be different on the left and right side of the main magnetic pole 61. The magnetization of the overall spin torque oscillator 10 can be sufficiently pinned if only one side of the spin torque oscillator 10 protrudes.

Next, a modification of this embodiment is described.

Figure 7:
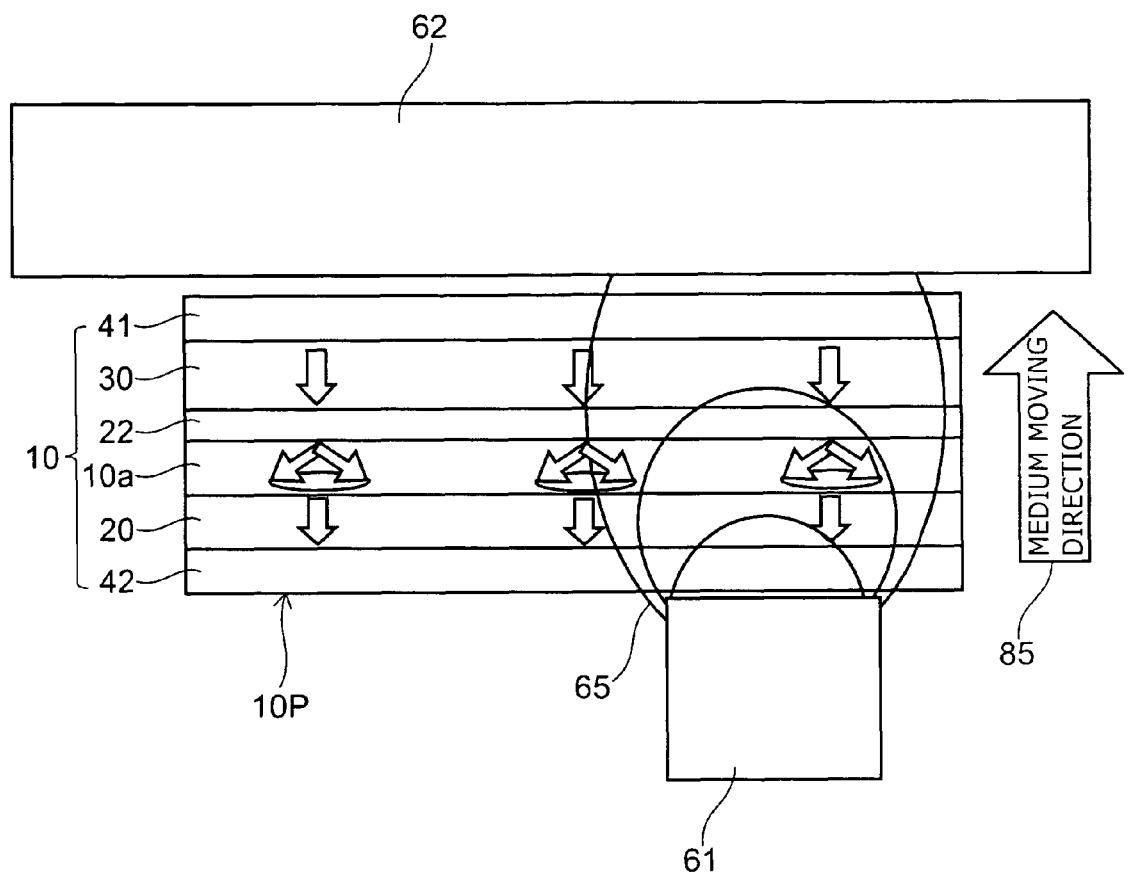
FIG. 7 is a schematic view showing the distribution of the magnetic field generated by the main magnetic pole.
Figure 8:
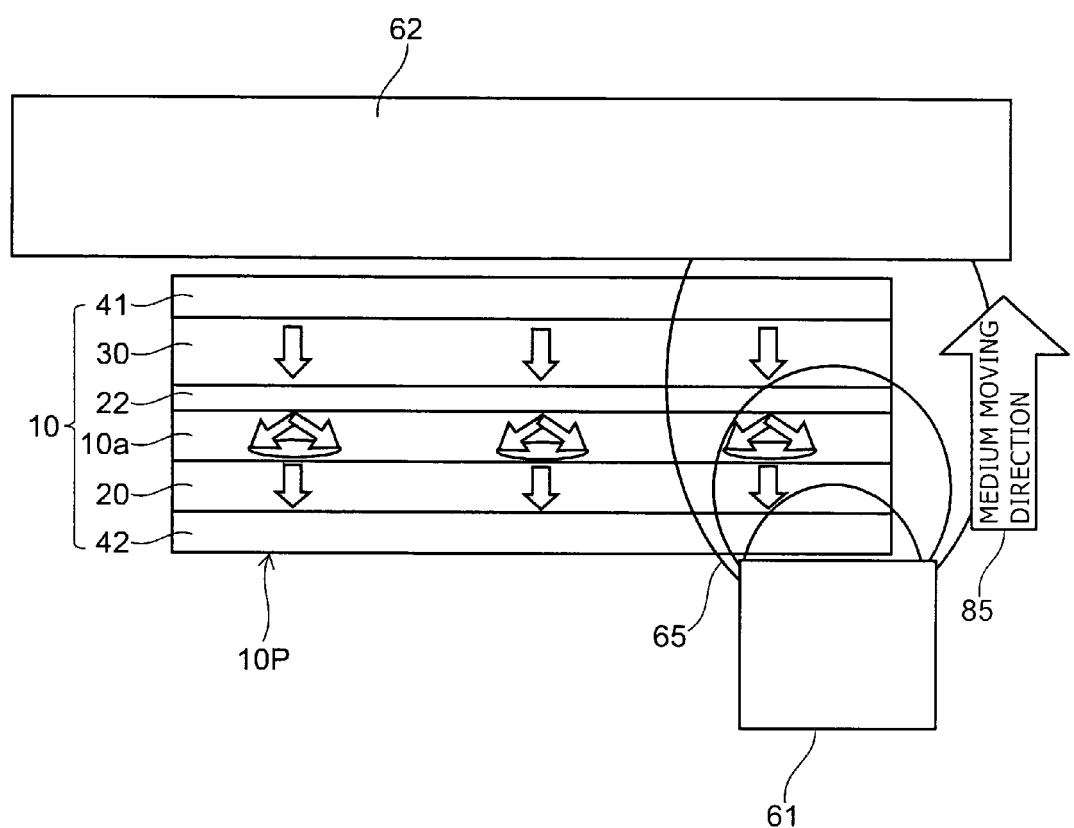
FIG. 8 is a schematic view showing the distribution of the magnetic field generated by the main magnetic pole.

FIGS. 7 and 8 are schematic views illustrating the cases of asymmetric positional relationship between the spin torque oscillator 10 and the main magnetic pole 61.

FIG. 7 shows the case where the main magnetic pole 61 is placed near one end of the spin torque oscillator 10. Of the portions protruding asymmetrically, at least the protruding portion that protrudes beyond the portion of the main magnetic pole core width to a greater extent has a length of the domain wall width or more, allowing pinning of the magnetization of the overall spin torque oscillator 10.

FIG. 8 shows the case where the main magnetic pole 61 extends off one end of the spin torque oscillator 10. The protruding portion of the spin torque oscillator 10 has a length of the domain wall width or more, hence allowing pinning of the magnetization of the overall spin torque oscillator 10.

In either case, the magnetization of the overall spin torque oscillator 10 can be sufficiently pinned.

In magnetic recording to a medium 80 by the magnetic recording head 5, when the air bearing surface 100 of the magnetic recording head 5 is held with a prescribed floating amount from the magnetic recording layer 81 of the medium 80, the distance (magnetic spacing) between the air bearing surface 100 and the center of thickness of the magnetic recording layer 81 is kept at generally 10 nm, for example. The gap between the air bearing surface 100 and the surface of the magnetic recording layer 81 is generally 5 nm.

The spin torque oscillator 10 can be placed on either the trailing side or the leading side of the main magnetic pole 61. This is because the medium magnetization is not reversed by the recording magnetic field of the main magnetic pole 61 alone, or by the high-frequency magnetic field of the spin torque oscillator 10 alone, but is reversed only in the region where the high-frequency magnetic field of the spin torque oscillator 10 is superposed on the recording magnetic field of the main magnetic pole 61.

Hence this embodiment can be used to provide a high-density magnetic recording apparatus having high reliability.

Next, a second embodiment of the invention is described.

Figure 9:
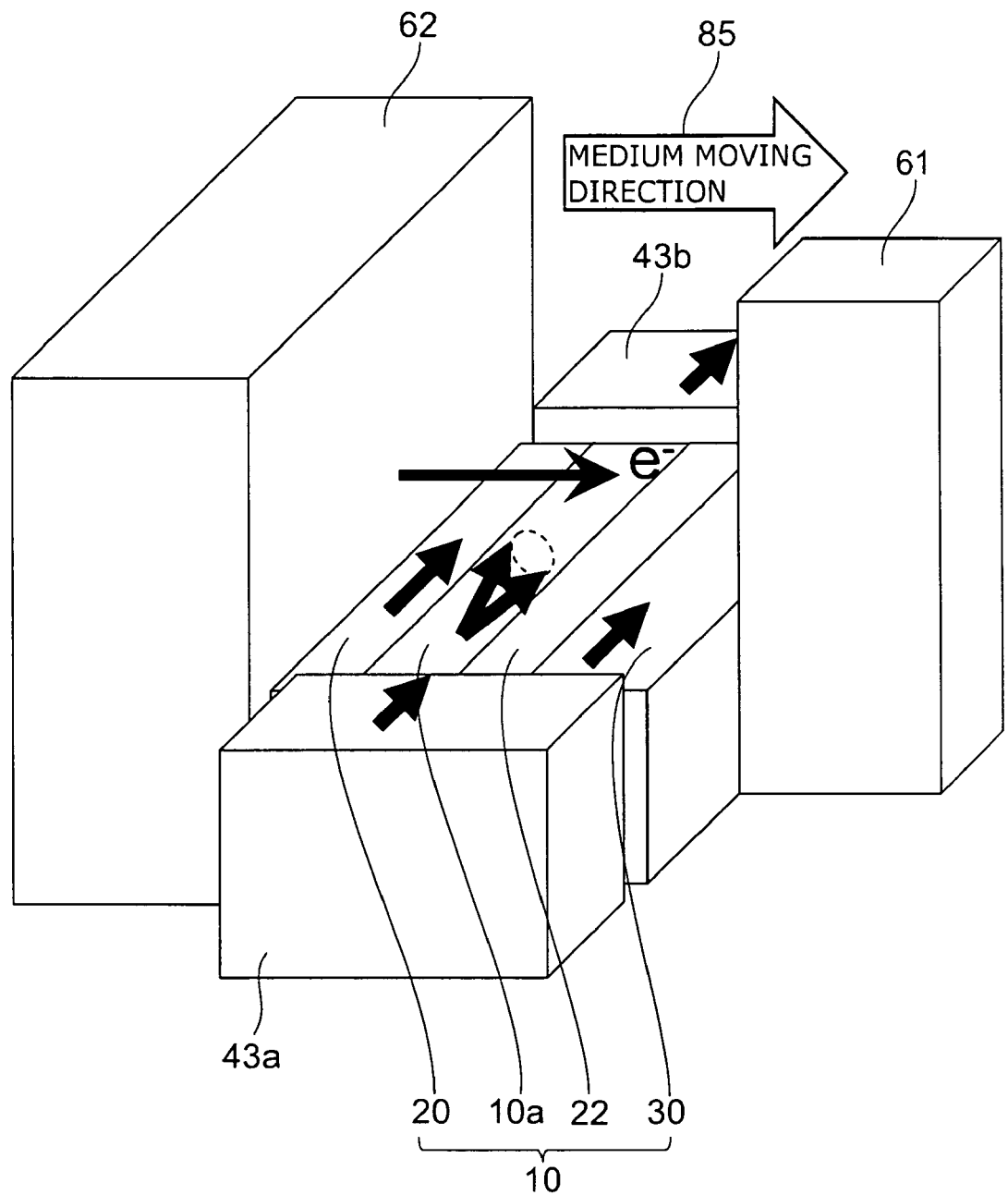
FIG. 9 is a perspective view showing the schematic configuration of a magnetic recording head.

FIG. 9 is a perspective view showing the schematic configuration of a magnetic recording head 5 provided with a spin torque oscillator 10 in this embodiment.

In this embodiment, a shield 62 is placed on the trailing side of the main magnetic pole 61, and the spin torque oscillator 10 is placed between the main magnetic pole 61 and the shield 62. The spin torque oscillator 10 is laminated in the medium moving direction, and the lamination plane is parallel to the facing plane of the main magnetic pole 61 and the shield 62. In the core width direction of the main magnetic pole 61, hard films 43a (magnetic film) and 43b are provided so as to sandwich the spin torque oscillator 10. The magnetization directions of the spin injection layer 30, the oscillation layer 10a, the bias layer 20, and the hard films 43a and 43b are longitudinal and parallel to the core width direction of the main magnetic pole 61. The hard films 43a and 43b are insulated from the spin torque oscillator 10.

The hard films 43a and 43b can be made of a CoPt alloy layer having high coercivity (Hc).

The spin injection layer 30 can be made of a SmCo alloy layer having high coercivity (Hc).

The oscillation layer 10a can be made of a soft magnetic FeCo/NiFe laminated film having high saturation magnetic flux density (Bs).

The oscillation layer 10a is preferably made of a soft magnetic material which has a lower coercivity (Hc) and a higher saturation magnetic flux density (Bs) than that of the spin injection layer 30 and hard films 43a and 43b.

The main magnetic pole 61 and the shield 62 also serve as electrodes for injecting a driving electron flow 52 that drives the spin torque oscillator 10.

A current diffusion layer made of a nonmagnetic material having high electrical resistivity such as Ta, Cr, Rh, Mo, W, or an alloy thereof may be placed between the main magnetic pole 61 and the spin torque oscillator 10. This can produce a uniform current distribution in the spin torque oscillator 10.

An intermediate layer may be interposed between the spin torque oscillator 10 and the shield 62. The intermediate layer is preferably made of a noble metal such as Cu, Pt, Au, Ag, Pd, or Ru, or can be made of a nonmagnetic transition metal such as Cr, Rh, Mo, or W. This breaks exchange coupling between the spin torque oscillator 10 and the shield 62 and allows the magnetization of the spin torque oscillator 10 to be independent of the domain configuration in the shield 62.

Next, the operation of the magnetic recording head of this embodiment is described.

Figure 10:
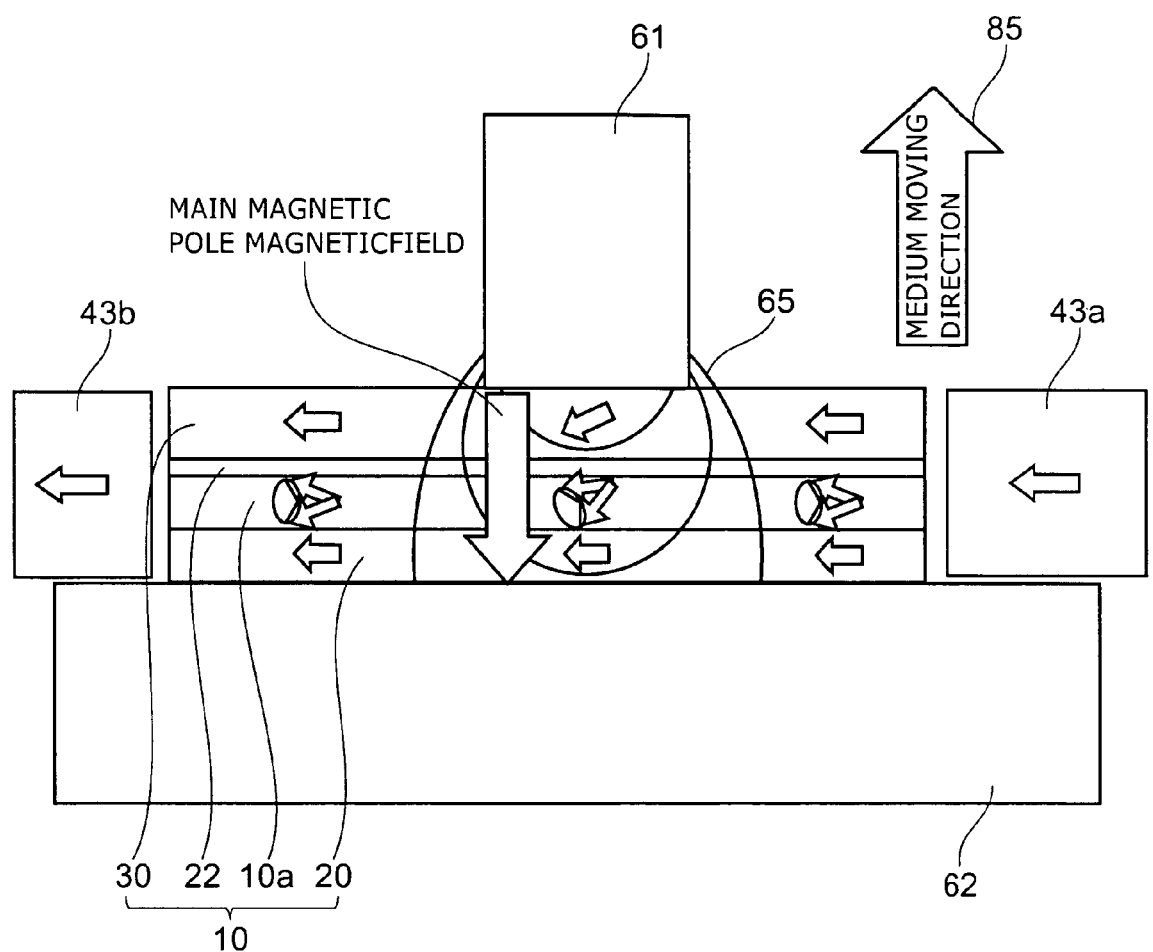
FIG. 10 is a schematic view showing the distribution of the magnetic field generated by the main magnetic pole.

FIG. 10 is a schematic view of the magnetization distribution in the spin torque oscillator 10 as viewed from the floating surface in the case where a positive magnetic field is applied from the main magnetic pole 61 to the spin torque oscillator 10.

The magnetic field applied from the main magnetic pole 61 to the spin torque oscillator 10 is restricted by the shield 62 to the core width dimension of the main magnetic pole 61. Hence the magnetic field from the main magnetic pole 61 is applied only to a portion of the spin injection layer 30, the oscillation layer 10a, and the bias layer 20 having the core width dimension of the main magnetic pole 61. In contrast, the magnetic field is not applied to the region of the spin injection layer 30, the oscillation layer 10a, and the bias layer 20 located away from the portion having the core width of the main magnetic pole 61. By the intralayer exchange coupling from the region located away from the portion having the core width of the main magnetic pole 61, the magnetization of the portion of the oscillation layer 10a having the core width of the main magnetic pole 61 is pinned. Hence little variation occurs in the magnetization of the portion of the oscillation layer 10a having the core width of the main magnetic pole 61. Thus the oscillation characteristics are nearly the same as those in the case where there is no magnetic field from the main magnetic pole 61.

Figure 11:
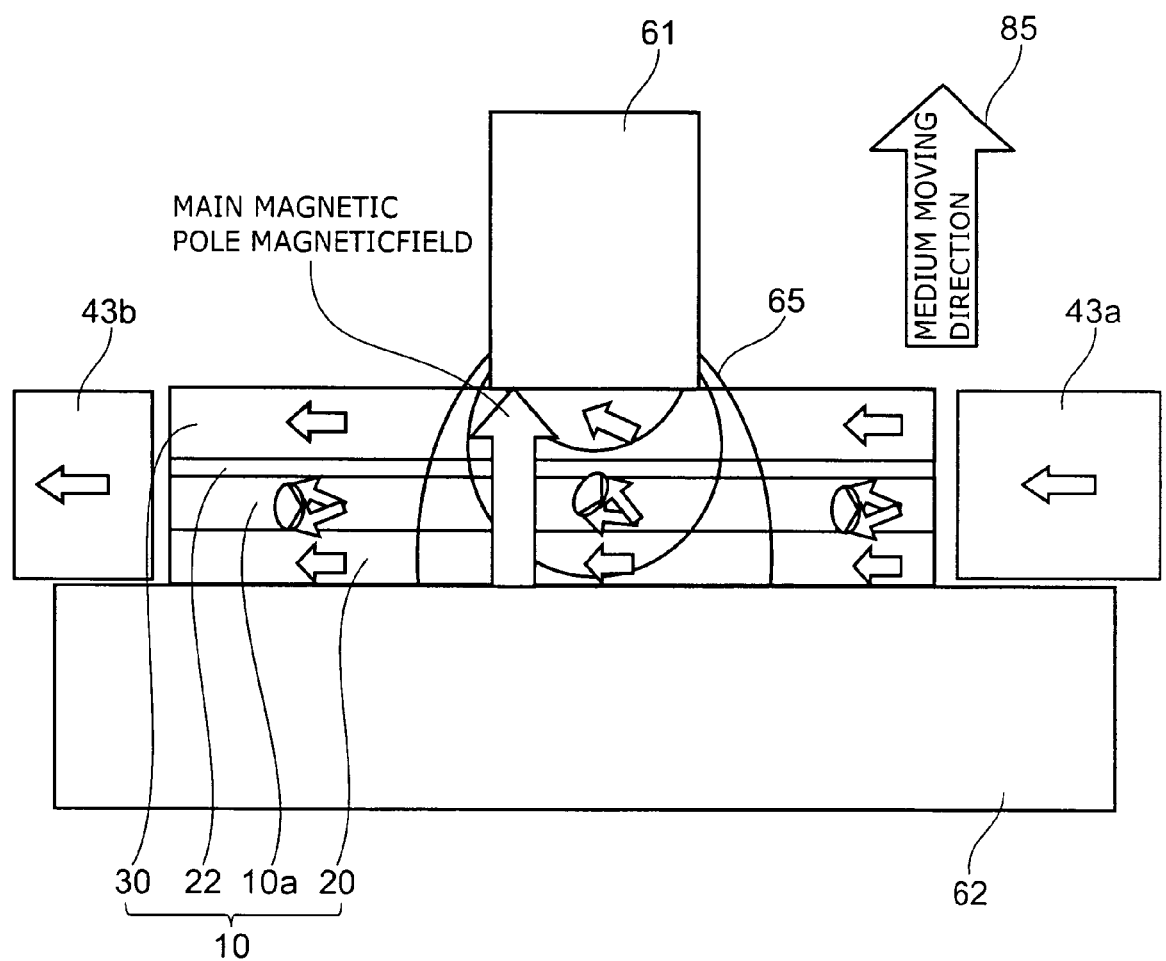
FIG. 11 is a schematic view showing the distribution of the magnetic field generated by the main magnetic pole.

FIG. 11 is a schematic view of the magnetization distribution in the spin torque oscillator 10 as viewed from the floating surface in the case where a negative magnetic field is applied from the main magnetic pole 61 to the spin torque oscillator 10.

The magnetizations for the positive and negative magnetic field are completely symmetric with respect to the longitudinal direction. Hence the discussion for the positive magnetic field of the main magnetic pole 61 applies directly. More specifically, the magnetic field from the main magnetic pole 61 is restricted to the portion of the spin injection layer 30, the oscillation layer 10a, and the bias layer 20 having the core width dimension of the main magnetic pole 61, and little variation occurs in the magnetization of the portion of the spin injection layer 30, the oscillation layer 10a, and the bias layer 20 having the core width of the main magnetic pole 61. Thus the oscillation characteristics are nearly the same as those in the case where there is no magnetic field from the main magnetic pole 61, as in the case where the magnetic field from the main magnetic pole 61 is positive.

Under the magnetic field from the main magnetic pole 61, the magnetization of the portion of the oscillation layer 10$a$ and the spin injection layer 30 having the core width of the main magnetic pole 61 is inclined toward the magnetic field from the main magnetic pole 61, but the inclination is small. Because the inclination is symmetric irrespective of the polarity of the magnetic field from the main magnetic pole 61, the generated magnetic field is the same, and the oscillation condition is also the same. The hard films 43$a$ and 43$b$ cancel out the charge produced on the end surfaces of the laminated film of the spin torque oscillator 10, and also serve to cancel out the magnetic field at the ends of the oscillation layer 10$a$ by magnetization biasing to control the magnetic domain.

FIG. 12 shows graphs illustrating the oscillation characteristics of the magnetic recording head shown in FIG. 9.

Figure 12A:
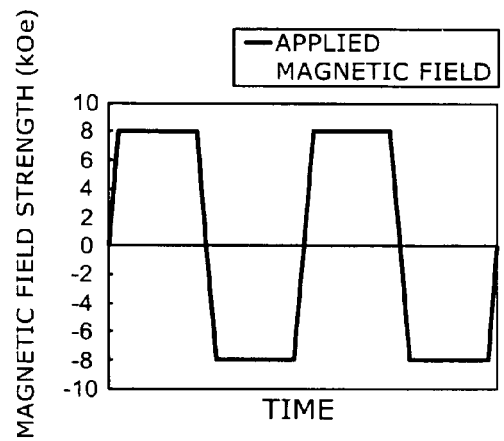
FIGS. 12A to 12D show graphs illustrating the write operation of the magnetic recording head shown in FIG. 9.
Figure 12C:
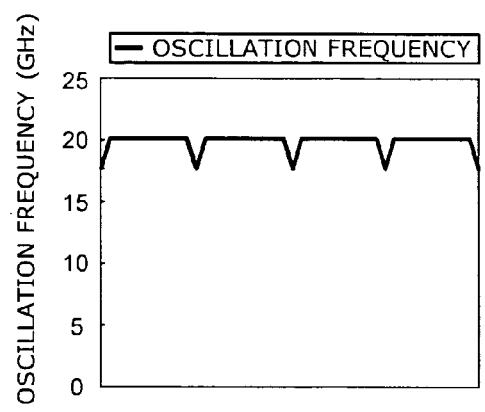
Figure 12B:
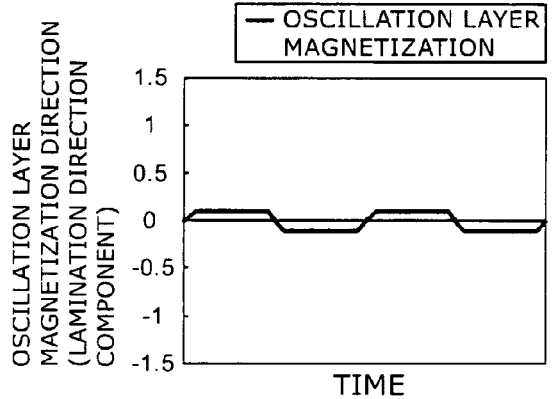
Figure 12D:
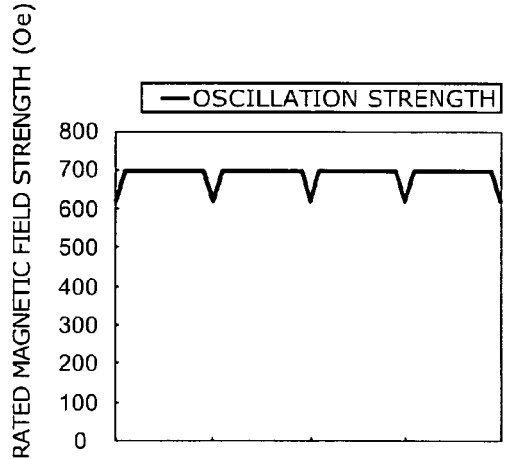

More specifically, FIG. 12A shows the time dependence of the magnetic field applied by the main magnetic pole 61 to the spin torque oscillator 10, FIG. 12B shows the time dependence of the magnetization direction of the oscillation layer 10$a$, FIG. 12C shows the time dependence of the oscillation frequency of the spin torque oscillator 10, and FIG. 12D shows the time dependence of the generated magnetic field strength.

A magnetic field is generated from the main magnetic pole 61 shown in FIG. 12A. However, as shown in FIG. 12B, in the oscillation layer 10$a$, the magnetization is small while its direction is alternated in polarity. As shown in FIG. 12C, variation in the oscillation frequency is also small. Furthermore, as shown in FIG. 12D, variation in the generated magnetic field is also held down.

Consequently, the oscillation characteristics do not depend on the magnetic field from the main magnetic pole 61.

Furthermore, when the magnetic field from the main magnetic pole 61 vanishes after completion of the write operation, the portion of the spin torque oscillator 10 having the core width of the main magnetic pole 61 is magnetized in the longitudinal direction by the intralayer exchange coupling in each of the spin injection layer 30, the oscillation layer 10$a$, and the bias layer 20, as well as the magnetic field from the hard films 43$a$ and 43$b$. This allows fabrication of a spin torque oscillator 10 having good aging characteristics.

The spin injection layer 30 and the bias layer 20 may be a laminated film of a ferromagnetic layer such as a CoPt alloy layer and an antiferromagnetic layer such as an IrMn, PtMn, or PdPtMn layer. By using such a laminated film, magnetization in the spin injection layer 30 and the bias layer 20 is made robust, allowing prevention of the aging change in the magnetization direction.

Also in this embodiment, the positional relationship between the main magnetic pole 61 and the spin torque oscillator 10 may be asymmetric. Like the case where the magnetization of the spin injection layer 30, the oscillation layer 10$a$, and the bias layer 20 is perpendicular to the plane, the magnetization of the oscillation layer 10$a$ having the core width of the main magnetic pole 61 is pinned by the exchange coupling from the portion to which the magnetic field from the main magnetic pole 61 is not applied. Consequently, the oscillation characteristics do not depend on the magnetic field from the main magnetic pole 61.

The hard film may be provided on only one side of the spin torque oscillator 10.

The remaining head configuration, the operating principle, and the effect in this embodiment are the same as those described in the first embodiment.

Next, a magnetic recording apparatus according to an embodiment of the invention is described. More specifically, the magnetic recording head 5 of the invention described with reference to FIGS. 1-5, 7-12 is illustratively incorporated in an integrated recording-reproducing magnetic head assembly, which can be installed on a magnetic recording/reproducing apparatus.

Figure 13:
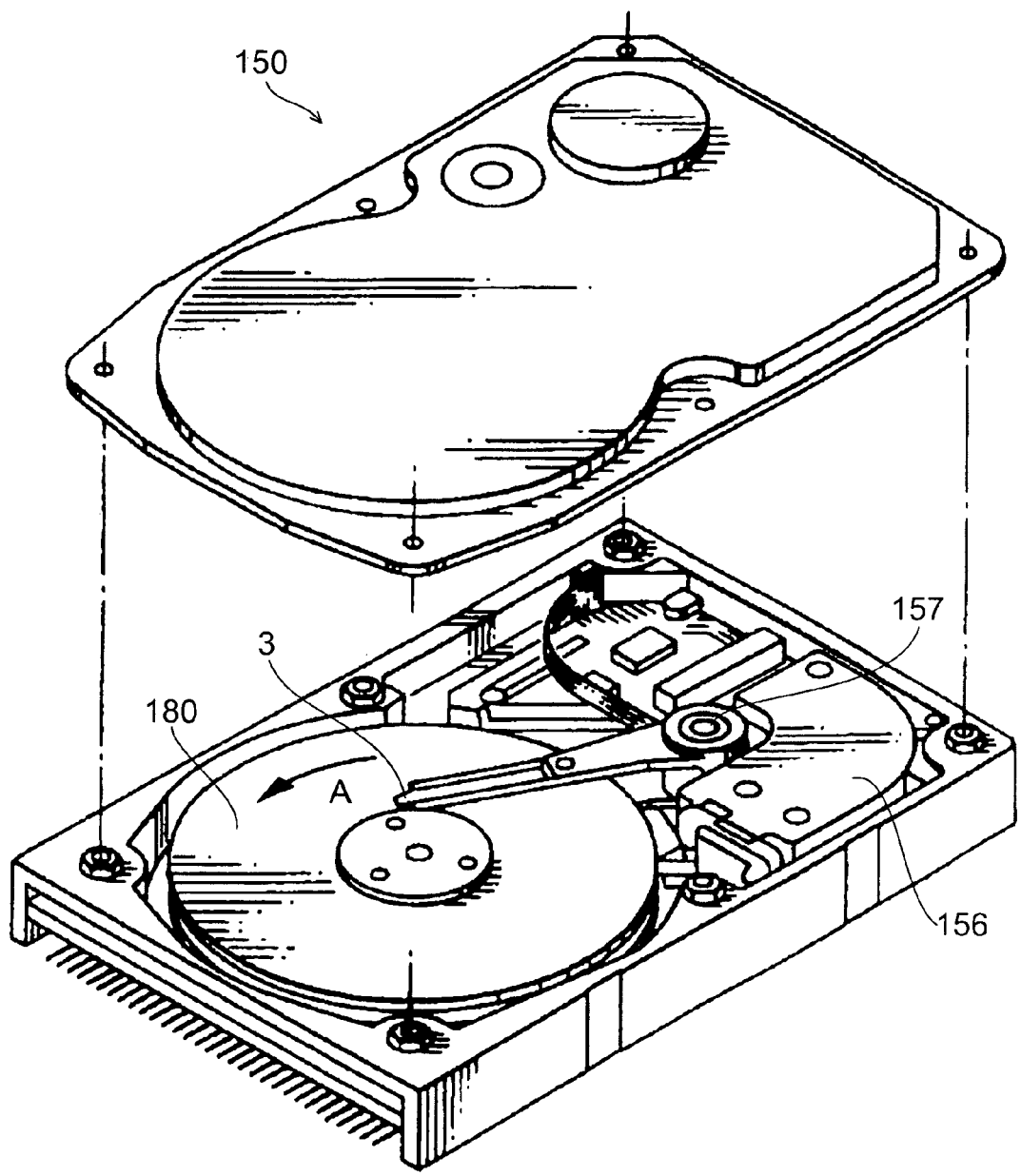
FIG. 13 is a principal perspective view illustrating the schematic configuration of a magnetic recording/reproducing apparatus.

FIG. 13 is a principal perspective view illustrating the schematic configuration of such a magnetic recording/reproducing apparatus.

More specifically, the magnetic recording/reproducing apparatus 150 of the invention is an apparatus based on a rotary actuator. In this figure, a recording medium disk 180 is mounted on a spindle 152 and rotated in the direction of arrow A by a motor, not shown, in response to a control signal from a drive controller, not shown. The magnetic recording/reproducing apparatus 150 of the invention may include a plurality of medium disks 180.

A head slider 3 for recording/reproducing information stored on the medium disk 180 has a configuration as described above with reference to FIG. 2 and is attached to the tip of a thin-film suspension 154. Here, a magnetic recording head according to any one of the above embodiments is illustratively installed near the tip of the head slider 3.

When the medium disk 180 is rotated, the air bearing surface (ABS) 100 of the head slider 3 is held at a prescribed floating amount from the surface of the medium disk 180. Alternatively, it is also possible to use a slider of the so-called "contact-traveling type", where the slider is in contact with the medium disk 180.

The suspension 154 is connected to one end of an actuator arm 155 including a bobbin for holding a driving coil, not shown. A voice coil motor 156, which is a kind of linear motor, is provided on the other end of the actuator arm 155. The voice coil motor 156 is composed of the driving coil, not shown, wound up around the bobbin of the actuator arm 155, and a magnetic circuit including a permanent magnet and an opposed yoke disposed so as to sandwich the coil therebetween.

The actuator arm 155 is held by ball bearings, not shown, provided at two positions above and below the spindle 157, and can be slidably rotated by the voice coil motor 156.

Figure 14:
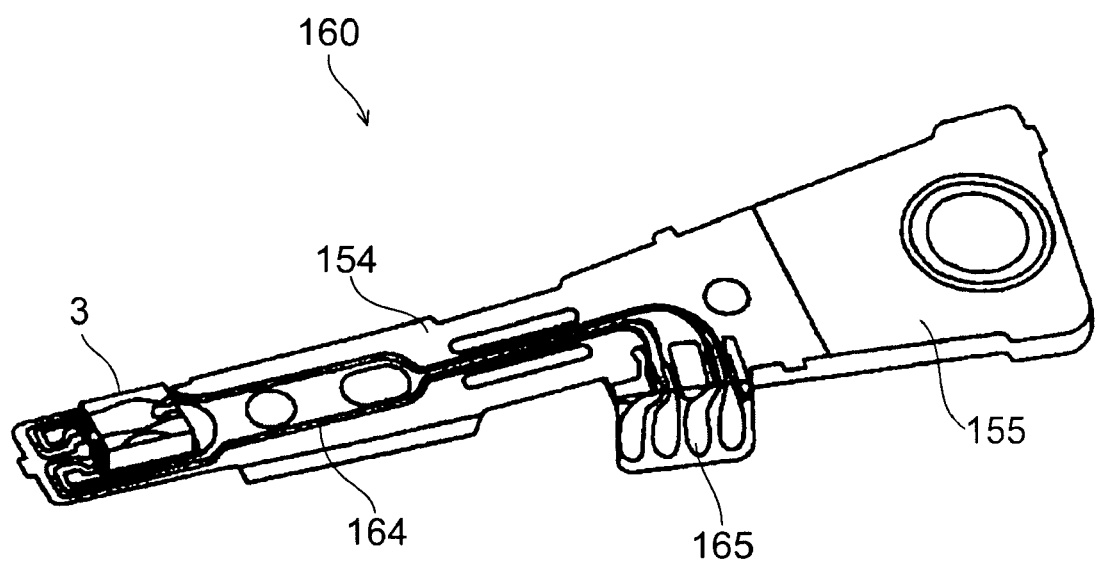
FIG. 14 is an enlarged perspective view of a magnetic head assembly ahead of an actuator arm 155.

FIG. 14 is an enlarged perspective view of the magnetic head assembly 160 ahead of the actuator arm 155 as viewed from the disk side. More specifically, the magnetic head assembly 160 has an actuator arm 155 illustratively including a bobbin for holding a driving coil, and a suspension 154 is connected to one end of the actuator arm 155.

To the tip of the suspension 154 is attached a head slider 3 including any one of the magnetic recording heads 5 described above with reference to FIGS. 1-5, 7-12. The suspension 154 has a lead 164 for writing and reading signals. The lead 164 is electrically connected to each electrode of the magnetic head incorporated in the head slider 3. In the figure, the reference numeral 165 denotes an electrode pad of the magnetic head assembly 160.

According to the invention, by using the magnetic recording head as described above with reference to FIGS. 1-5, 7-12, it is possible to reliably record information on the perpendicular magnetic recording medium disk 180 with higher recording density than conventional. Here, for effective microwave assisted magnetic recording, preferably, the resonance frequency of the medium disk 180 to be used is nearly equal to the oscillation frequency of the spin torque oscillator 10.

Figure 15:
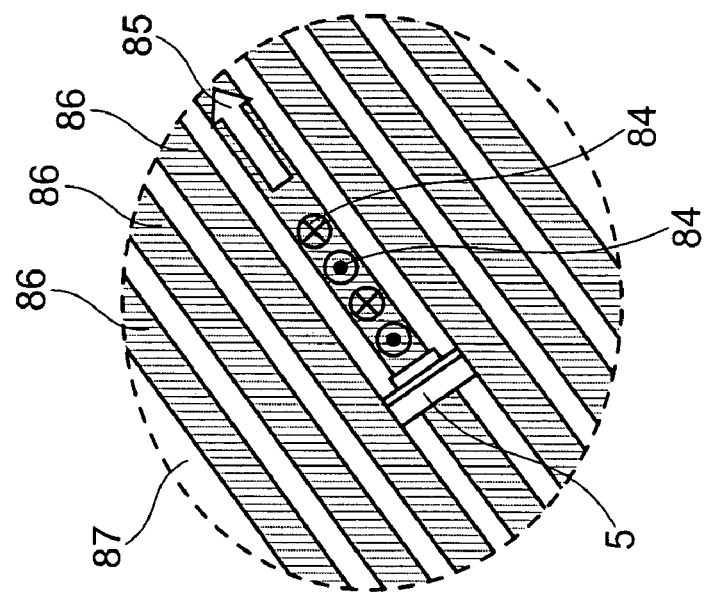
FIG. 15 is a schematic view illustrating a magnetic recording medium that can be used in the embodiment.
Figure 15:
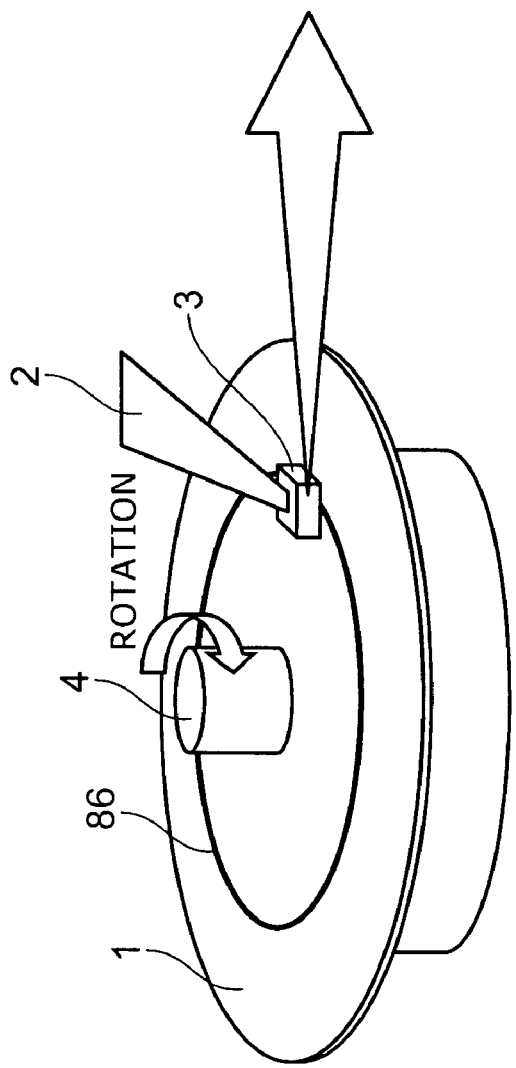

FIG. 15 is a schematic view illustrating a magnetic recording medium that can be used in this embodiment.

More specifically, the magnetic recording medium 1 of this embodiment includes perpendicularly oriented, multiparticle magnetic discrete tracks 86 separated from each other by a nonmagnetic material (or air) 87. When this medium 1 is rotated by a spindle motor 4 and moved toward the medium moving direction 85, a recording magnetization 84 can be produced by the magnetic recording head 5 described above with reference to FIGS. 1-5, 7-12.

By setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leaked high-frequency magnetic field generated from the spin torque oscillator 10. Hence, in the magnetic recording medium 1 of this example, only the recording track 86 to be recorded can be effectively subjected to microwave assisted magnetic recording.

According to this embodiment, a microwave assisted magnetic recording apparatus with narrow tracks, i.e., high track density, is realized more easily than in the case of using a multiparticle perpendicular medium made of the so-called "blanket film". Furthermore, by using the microwave assisted magnetic recording scheme and using a magnetic medium material with high magnetic anisotropy energy (Ku) such as FePt or SmCo, which cannot be written by conventional magnetic recording heads, magnetic medium particles can be further downscaled to the size of nanometers. Thus it is possible to realize a magnetic recording apparatus having far higher linear recording density than conventional also in the recording track direction (bit direction).

Figure 16:
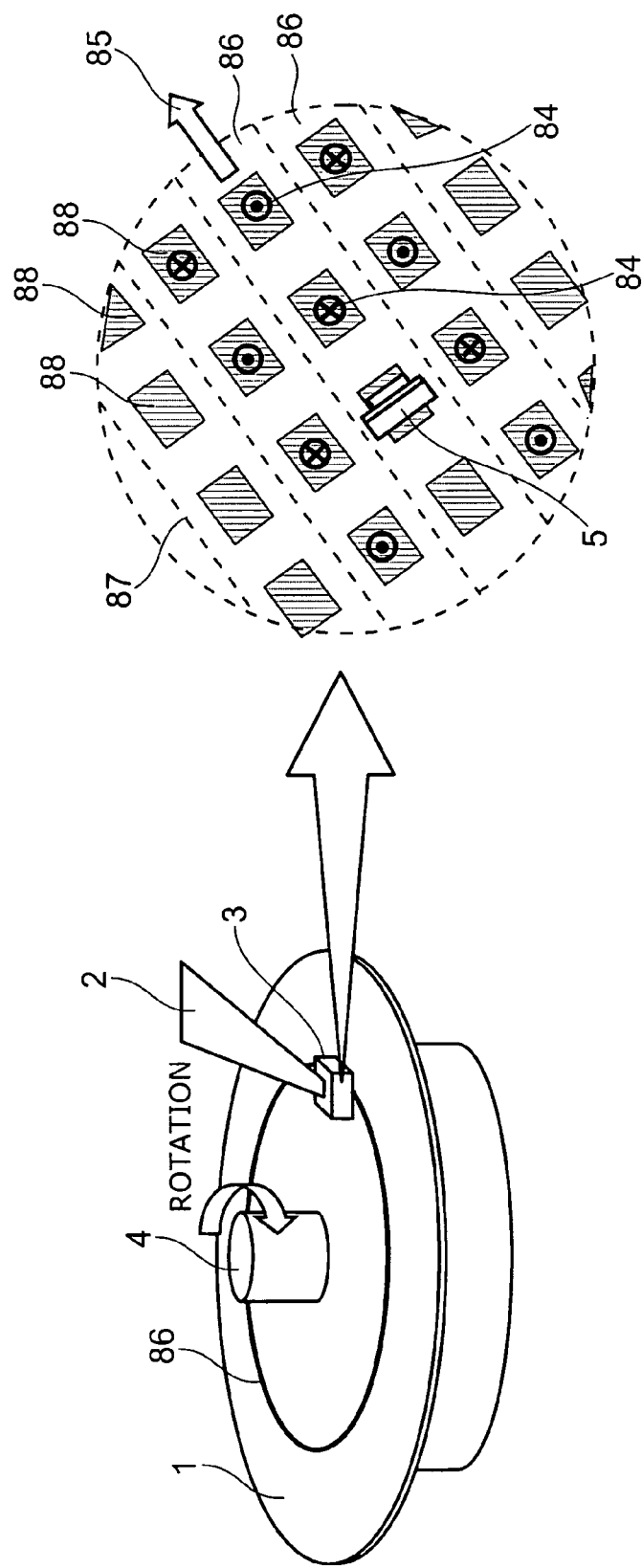
FIG. 16 is a schematic view illustrating another magnetic recording medium that can be used in the embodiment.

FIG. 16 is a schematic view illustrating another magnetic recording medium that can be used in this embodiment.

More specifically, the magnetic recording medium 1 of this example includes magnetic discrete bits 88 separated from each other by a nonmagnetic material 87. When this medium 1 is rotated by a spindle motor 4 and moved toward the medium moving direction 85, a recording magnetization 84 can be produced by the magnetic recording head 5 described above with reference to FIGS. 1-5, 7-12.

According to the invention, as shown in FIGS. 15 and 16, recording can be reliably performed also on the recording layer having high coercivity in a discrete-type magnetic recording medium 1, allowing magnetic recording with high density and high speed.

Also in this example, by setting the width (TS) of the spin torque oscillator 10 in the width direction of the recording track to not less than the width (TW) of the recording track 86 and not more than the recording track pitch (TP), it is possible to significantly prevent the decrease of coercivity in adjacent recording tracks due to leaked high-frequency magnetic field generated from the spin torque oscillator 10. Hence only the recording track 86 to be recorded can be effectively subjected to microwave assisted magnetic recording. According to this example, by downscaling the magnetic discrete bit 88 and increasing its magnetic anisotropy energy (Ku), there is a possibility of realizing a microwave assisted magnetic recording apparatus having a recording density of 10 Tbits/inch$^2$ or more as long as thermal fluctuation resistance under the operating environment can be maintained.

The embodiments of the invention have been described with reference to the examples. However, the invention is not limited to the above examples. For instance, two or more of the examples described above with reference to FIGS. 1-5, 7-16 can be combined as long as technically feasible, and such combinations are also encompassed within the scope of the invention.

That is, the invention is not limited to the examples, but can be practiced in various modifications without departing from the spirit of the invention, and such modifications are all encompassed within the scope of the invention.

The invention claimed is:

1. A magnetic recording and reproducing head comprising:
   a writing head section; and
   a reproducing head section,
   the writing head section including:
   a main magnetic pole;
   a laminated body including a first magnetic layer, a second magnetic layer, and an intermediate layer provided between the first magnetic layer and the second magnetic layer;
   a pair of electrodes operable to pass a current through the laminated body; and
   a coil juxtaposed to the main magnetic pole and supplied with a writing signal,
   a lamination direction of the laminated body being substantially parallel to a medium moving direction, and
   in a first direction parallel to an air bearing surface and perpendicular to the lamination direction, a first part of the laminated body protruding beyond an end of a surface of the main magnetic pole facing the laminated body.

2. The head according to claim 1, wherein plural parts of the laminated body protrude beyond an end of a surface of the main magnetic pole facing the laminated body, and the plural parts have different shapes.

3. The head according to claim 1, wherein a length of the first part of the laminated body in the first direction is not less than a domain wall width of the first magnetic layer.

4. The head according to claim 1, further comprising a shield, wherein the laminated body is sandwiched between the shield and the main magnetic pole.

5. The head according to claim 1, further comprising further comprising a magnetic film provided on at least one side of the laminated body in the first direction.

6. The head according to claim 1, wherein the first magnetic layer is made of a magnetic material having a lower coercivity and a higher saturation magnetic flux density than that of the second magnetic layer.

7. The head according to claim 5, wherein the magnetic film is made of a magnetic material having higher coercivity than that of the first magnetic layer.

8. The head according to claim 1, wherein a second part of the laminated body protrudes in a second direction which is opposite to the first direction beyond the end of the surface, and a length of the first part that protrudes in the first direction is different from a length of the second part that protrudes in the second direction.

9. The head according to claim 1, wherein
   the main magnetic pole protrudes in a second direction which is opposite to the first direction beyond an end of a surface of the laminated body facing the main magnetic pole.

10. A magnetic recording apparatus comprising:
    a magnetic recording medium;
    a magnetic recording and reproducing head including:
    a writing head section; and
    a reproducing head section,
    the writing head section including:
    a main magnetic pole;
    a laminated body including a first magnetic layer, a second magnetic layer, and an intermediate layer provided between the first magnetic layer and the second magnetic layer; and
    a pair of electrodes operable to pass a current through the laminated body, a lamination direction of the laminated body being substantially parallel to a medium moving direction, and in a first direction parallel to an air bearing surface and perpendicular to the lamination direction, a first part of the laminated body protruding beyond an end of a surface of the main magnetic pole facing the laminated body; and a coil juxtaposed to the main magnetic pole and supplied with a writing signal;

a moving mechanism configured to allow relative movement between the magnetic recording medium and the magnetic recording head which are opposed to each other with a spacing therebetween or in contact with each other;

a controller configured to position the magnetic recording head at a prescribed recording position of the magnetic recording medium; and a signal processing unit configured to perform writing and reading of a signal on the magnetic recording medium by using the magnetic recording head.

11. The apparatus according to claim 10, wherein plural parts of the laminated body protrude beyond an end of a surface of the main magnetic pole facing the laminated body, and the plural parts have different shapes.

12. The apparatus according to claim 10, wherein a length of the first part of the laminated body in the first direction is not less than a domain wall width of the first magnetic layer.

13. The apparatus according to claim 10, further comprising a shield, wherein the laminated body is sandwiched between the shield and the main magnetic pole.

14. The apparatus according to claim 10, further comprising a magnetic film provided on at least one side of the laminated body in the first direction.

15. The apparatus according to claim 10, wherein the first magnetic layer is made of a magnetic material having a lower coercivity and a higher saturation magnetic flux density than that of the second magnetic layer.

16. The apparatus according to claim 10, wherein a second part of the laminated body protrudes in a second direction which is opposite to the first direction beyond the end of the surface, and a length of the first part that protrudes in the first direction is different from a length of the second part that protrudes in the second direction.

17. The apparatus according to claim 10, wherein the laminated body in the writing head section is provided on a trailing side of the main magnetic pole.

18. The apparatus according to claim 10, wherein the laminated body in the writing head section is provided on a leading side of the main magnetic pole.

19. The apparatus according to claim 10, wherein the magnetic recording medium is a discrete track medium in which adjacent recording tracks are formed via a nonmagnetic member.

20. The apparatus according to claim 10, wherein the magnetic recording medium is a discrete bit medium in which magnetic recording dots isolated by a nonmagnetic member are regularly arranged.

* * * * *